US010679082B2

(12) United States Patent
Hecker et al.

(10) Patent No.: US 10,679,082 B2
(45) Date of Patent: Jun. 9, 2020

(54) SELF-SERVICE TERMINAL (SST) FACIAL AUTHENTICATION PROCESSING (71) Applicant: NCR Corporation, Duluth, GA (US)

(72) Inventors: Weston Lee Hecker, Bismarck, ND (US); Nir Veltman, Johns Creek, GA (US); Yehoshua Zvi Licht, Alpharetta, GA (US)

(73) Assignee: NCR Corporation, Atlanta, GA (US)

( * ) Notice: Subject to any disclaimer, the term of this patent is extended or adjusted under 35 U.S.C. 154(b) by 98 days.

(21) Appl. No.: 15/719,083

(22) Filed: Sep. 28, 2017

(65) Prior Publication Data
US 2019/0095737 A1 Mar. 28, 2019

(51) Int. Cl.
G06K 9/00 (2006.01)
G06K 9/34 (2006.01)
G06K 9/40 (2006.01)
G06K 9/46 (2006.01)
G06Q 20/40 (2012.01)
G06Q 20/18 (2012.01)
G06N 20/00 (2019.01)
G06K 9/62 (2006.01)

(52) U.S. Cl.
CPC ..... G06K 9/00899 (2013.01); G06K 9/00234 (2013.01); G06K 9/00288 (2013.01); G06K 9/00926 (2013.01); G06K 9/4661 (2013.01); G06K 9/6202 (2013.01); G06N 20/00 (2019.01); G06Q 20/18 (2013.01); G06Q 20/40145 (2013.01)

(58) Field of Classification Search
USPC ................................. 382/118, 116, 180, 274
See application file for complete search history.

(56) References Cited

U.S. PATENT DOCUMENTS

| 6,633,655 | B1 * | 10/2003 | Hong | G06K 9/00255 382/118 |
| 8,121,356 | B2 * | 2/2012 | Friedman | G06K 9/00604 348/143 |
| 8,218,831 | B2 * | 7/2012 | Tian | G06K 9/00234 348/143 |
| 8,253,792 | B2 * | 8/2012 | Wells | H04N 7/181 348/152 |
| 8,351,660 | B2 * | 1/2013 | Guo | G06K 9/00234 117/209 |

(Continued)

FOREIGN PATENT DOCUMENTS

WO 2016/077590 A2 5/2016

OTHER PUBLICATIONS

EP Search report—dated Feb. 5, 2019.

Primary Examiner — Kathleen Y Dulaney
(74) Attorney, Agent, or Firm — Schwegman, Lundberg & Woessner (57) ABSTRACT Real-time facial recognition is augmented with a machine-learning process that samples pixels from images captured for the physical environmental background of a device, which captures an image of a user's face for facial authentication. The background pixel points that are present in a captured image of a user's face from a camera of the device are authenticated with the image of the user's face. The value of the background pixel points are compared against the expected values for the background pixel points provided by the on-going machine-learning process for the background.

10 Claims, 5 Drawing Sheets

(56) References Cited

U.S. PATENT DOCUMENTS

| | | | |
|---|---|---|---|
| 8,406,484 B2* | 3/2013 | Yoon | G06K 9/00214 345/419 |
| 8,433,104 B2* | 4/2013 | Cheng | G06K 9/00375 382/103 |
| 8,724,856 B1* | 5/2014 | King | G07D 7/202 382/115 |
| 9,811,649 B2 | 11/2017 | Pfursich et al. | |
| 2005/0063566 A1* | 3/2005 | Beek | A61B 5/1077 382/115 |
| 2008/0002864 A1* | 1/2008 | Das | G06K 9/00664 382/118 |
| 2008/0247609 A1* | 10/2008 | Feris | G06K 9/00228 382/118 |
| 2009/0153678 A1* | 6/2009 | Nonaka | G06F 3/017 348/208.4 |
| 2011/0188712 A1* | 8/2011 | Yoo | G06K 9/00 382/118 |
| 2011/0211736 A1* | 9/2011 | Krupka | G06K 9/00677 382/118 |
| 2011/0211737 A1* | 9/2011 | Krupka | G06F 16/58 382/118 |
| 2012/0155717 A1* | 6/2012 | Ma | G06F 16/5854 382/118 |
| 2013/0286256 A1* | 10/2013 | Choi | G06K 9/00275 348/240.2 |
| 2014/0241592 A1* | 8/2014 | Yang | G06T 5/001 382/118 |
| 2014/0270412 A1* | 9/2014 | Ma | G06K 9/00221 382/118 |
| 2015/0030214 A1* | 1/2015 | Fujiwara | G06F 21/32 382/118 |
| 2015/0055835 A1* | 2/2015 | Ozawa | G06T 11/60 382/118 |
| 2015/0139508 A1* | 5/2015 | Ye | G06K 9/00892 382/116 |
| 2016/0140405 A1* | 5/2016 | Graumann | G06K 9/00281 382/118 |
| 2016/0154994 A1* | 6/2016 | Kim | G06K 9/00248 382/118 |
| 2016/0379042 A1* | 12/2016 | Bourlai | G06K 9/00288 382/118 |
| 2018/0034852 A1* | 2/2018 | Goldenberg | G06F 21/32 |
| 2018/0181737 A1* | 6/2018 | Tussy | G06K 9/00288 |
| 2018/0286075 A1* | 10/2018 | Jones | G06F 3/041 |
| 2019/0026544 A1* | 1/2019 | Hua | G06K 9/00288 |

* cited by examiner

SELF-SERVICE TERMINAL (SST) FACIAL AUTHENTICATION PROCESSING

BACKGROUND

User authentication is continuously changing and being enhanced to thwart fraudulent attempts of imposters that pose as a true user.

Biometric authentication is believed to be a strong authentication technique. Consequently, biometric authentication has been embraced and adopted by many industries. The two most popular biometric authentication mechanism are fingerprint authentication and facial authentication.

As with any authentication technique, biometric authentication is not foolproof and can be circumvented by inexpensive and ingenious techniques employed by hackers. For example, hackers have figured out that facial authentication can be tricked through use of a photograph or video of the true user, which is presented in front of the camera of the authenticating device for purposes of authenticating as the true user and gaining access to resources and assets accessible only to the true user.

The issue of spoofing a user's true identity through a photograph or a video is becoming particularly problematic for Self-Service Terminals (SSTs), such as Automated Teller Machines (ATMs), where a spoofed user's identity can result in substantial monetary losses for financial institutions and/or users.

SUMMARY

In various embodiments, methods and a system for SST facial authentication are presented.

According to an embodiment, a method for SST facial authentication is provided. Specifically, and in one embodiment, pixels representing a background and representing a face of a user are sampled from an image that is captured of the user. The user is authenticated for access to a resource when values for the pixels are within a threshold of expected values for the pixels.

DETAILED DESCRIPTION

Figure 1A:
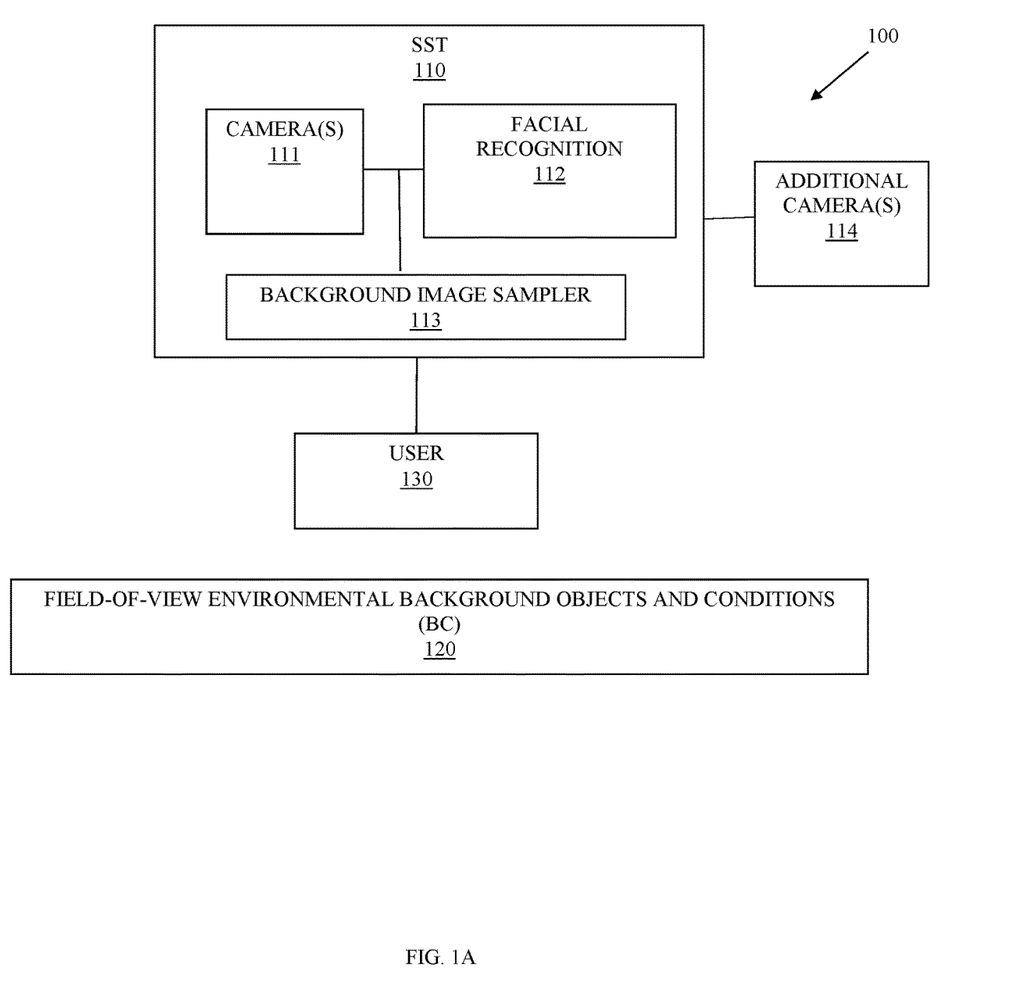
FIG. 1A is a diagram of a system for SST facial authentication, according to an example embodiment.

FIG. 1A is a diagram of a system 100 for SST facial authentication, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the SST facial authentication teachings presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for SST facial authentication can be implemented in all, or some combination of the components shown in different hardware computing devices having one or more hardware processors.

As used herein and below, the terms "user," "consumer," and "customer" may be used synonymously and interchangeably.

The system 100 includes: a SST 110 having one or more cameras 111, facial recognition software module 112 ("facial recognition 112"), and a background image sampler software module 113 ("background image sampler 113"). The system 100 may also include one or more additional external cameras 114 ("additional cameras 114") whose image/video output is accessible to the SST 110.

The system 100 includes a machine learning algorithm that trains to learn the physical environment of objects, structures, and lighting that are within the field of view of the camera 111 and/or the additional cameras 114. These objects and structures and lighting conditions are referred to as the field-of-view (FOV) environmental background objects and conditions 120 ("BC" 120) in the FIG. 1A.

Initially, a user 130 that desires to be authenticated at the SST 110 registers a photograph, comes into an enterprise for a photograph, or provides a video of a mobile device for purposes of registering the user's face for facial authentication. The actual image (photograph) of the user is cropped such that just the user's face is provided with the registered image (no background image pixels are noted or used in the user's facial image).

The facial recognition 112, during an initial configuration and training period of a configured period of time, obtains sample pixel points from images of the BC 120 from the image sampler 113. The facial recognition 112 also learns the different degrees of light brightness, intensity, and colors for each of the sampled pixel points based on the time of day, day of week, calendar day, etc. The pixel values for sampled pixel points can change based on the light attributes (brightness, intensity, even colors). The time of day, weather outside, and day of year can also affect the light attributes of pixel values for the sampled pixel points (the sun typically rises and sets at different times of the year, a storm during daylight hours, etc.).

In an embodiment, the initial configuration and training period of the configured time period is 24 hours (1 full day).

During subsequent operation, the facial recognition 112 uses the image sampler 113 to continually train and update when the SST 110 is not in use by a user. This continual training allows the facial recognition 112 to separate objects that are not stationary from permanent objects in the BC 120, for example a window frame is stationary (likely permanent) but what is detected through the window changes and the window may be covered with shades or curtains or blocked by another object subsequent to the initial training period. Pictures and wall color may also change and objects can be added and removed from the BC 120. For an SST 110 situated outdoors, the facial recognition can continual learn through the training permanent objects versus transitory objects (such as stop signs, roads, trees, buildings, street lights, a fallen tree from a storm, a building being constructed, etc.).

In an embodiment, the facial recognition 112 may also have access to the current weather conditions for the geographical location where the SST 110 is situated through a network connection. This allows the initial and ongoing dynamic training to learn the expected light attributes for the sampled pixel points based on the current weather.

The camera 111 and the additional cameras 114 (which are stationary within the environment of the SST 110) collect images from the BC 120 and the images are obtained by the image sampler 113. The sampled pixel points are extracted and the pixel values are collected for comparison by the sampler 113 against what was previously collected and expected for those pixel points. Any deviation in lighting attributes (intensity, color, brightness) triggers a refresh for the sampler 113 to perform a renewed sampling of the pixel points, which sets the pixel values for the newly sampled pixel points.

Figure 1B:
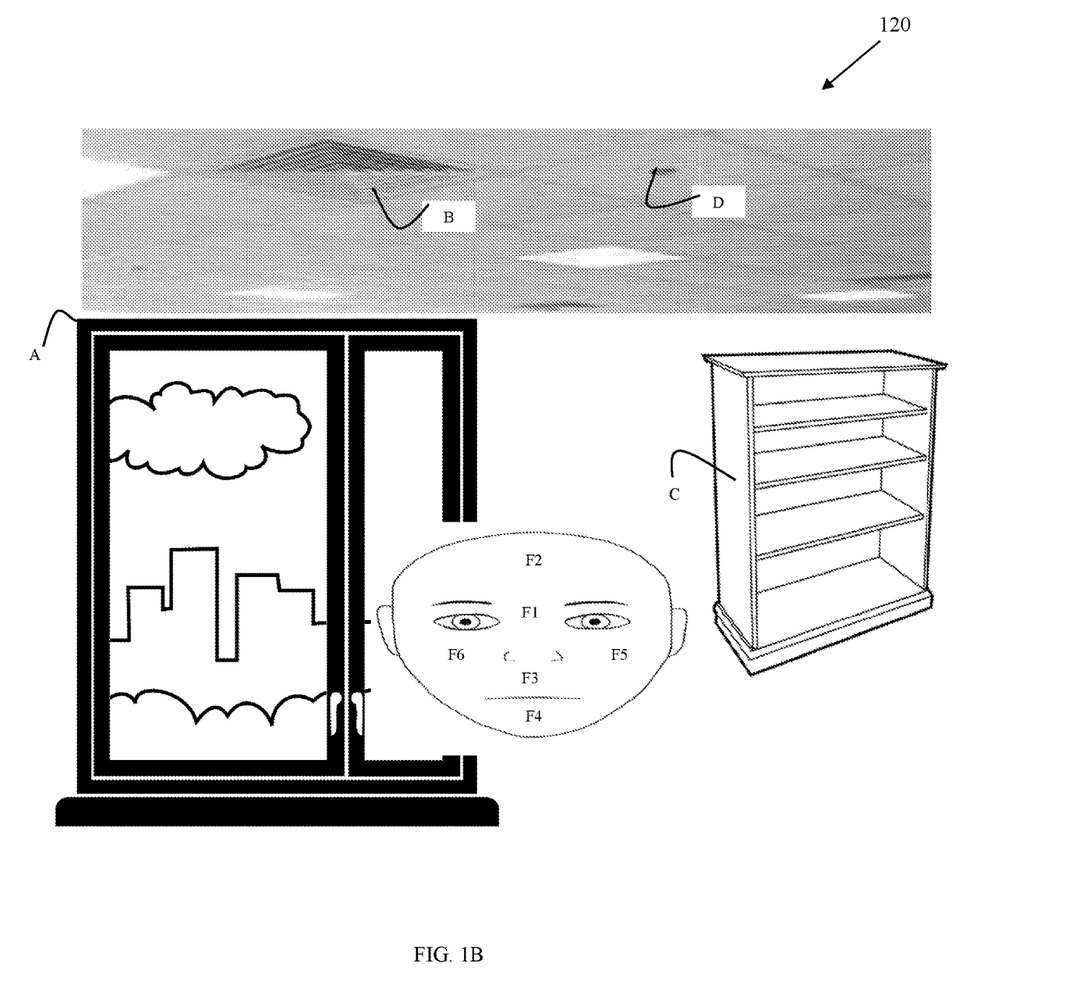
FIG. 1B is a diagram of sampled points of information processed from an image of a user's face and environment objects in the environment of the SST, according to an example embodiment.

The FIG. 1B is a diagram of sampled points of information processed from an image of a user's face and environment objects in the environment of the SST, according to an example embodiment.

When the user 130 is standing in front of the SST 110 and is attempting to authenticate for access to the SST 110 or an account associated with the user 130, the facial recognition processing is performed utilizing facial recognition processing that samples points (such as points F1-F6 in the FIG. 1B), if the sampled points are not within a predefined threshold of what is expected for the user 130, the authentication fails.

In an embodiment, the facial recognition 112 performs a depth analysis of the image captured by the camera 111 to determine whether there is sufficiently detected depth detectable from the captured image of the user's face. This can be achieved through color analysis because printed images have distinctive colors that do not match normal skin tones or may have excessive amounts of a particular color based on the quality of the printer. Abnormalities between a printed image and a live image of a face may also be detected. Scale of the image captured versus a known scale for the FOV of the camera 111 can also be used to detect the abnormalities between a live image of the user's face versus a live image of a printed image of the user's face. When the depth appears to not be present, based on a threshold value, the facial recognition fails and authentication of the user 130 is denied.

However, when the sampled points are within the predefined threshold, authentication is not over as would typically be the case for biometric facial recognition. Rather, the facial recognition 112 consults the sampler for sampled points from the BC 120 (such as points A-D in the FIG. 1B). The facial recognition 112 then determines whether the sampled points from the BC 120 are within an expected tolerance (threshold) and if they are authentication of the user is confirmed, when they are not authentication fails.

It is to be noted that many more pixel points are processed for the facial recognition from what is illustrated in the FIG. 1B; this was done in the interest of comprehension. Similarly, the can be many more BC 120 pixel points beyond what is illustrated in the FIG. 1B. Therefore, the embodiments presented herein are not restricted to a certain total number of sampled pixel points, since the total number of sampled pixel points for the image of a face and/or for objects in the BC 120 can be configured as processing parameters and even dynamically adjusted/changed for the BC 120 through the machine-learning process.

The system 100 prevents attempts made by a user 130 to authenticate via facial recognition through presentation of a video (on a display of a user-operated mobile device) or an image (printed image or displayed image on a display of a user-operated mobile device) of the user within the FOV of the camera 111 during the facial authentication of a user 130. This is achieved through training and continually learning sampled pixel points from images captured for the BC 120 during non-interaction periods (no user 130 is transacting at the SST 110) for the SST 110. During facial authentication, the dynamic expected background (BC 120—expected pixel points and light attributes for those pixel points in the images captured for the BC 120) is authenticated in addition to the user's face from field of view of the camera 111. The sampled background image pixel points (for the BC 120) include light attributes which are also used in authenticating the BC 120. This substantially thwarts a user's ability to spoof the facial authentication with a printed image of the user 130 or with a mobile device display placed in front of the camera 111 in which a video of the user is played or an image is displayed for capturing by the camera 111. Should the user attempt to place a life-sized cut out image of the user 130 in front of the field of view of the camera 111, depth detection processing as discussed above can be used to detect and thwart this situation.

In an embodiment, the additional (stationary) cameras 114 may also be used by the sampler 113 for training the facial recognition 112.

In an embodiment, the system 100 can be implemented into any stationary computing device, such as a desktop computer of a server (for authenticating directed access to the server in a server room).

In an embodiment, the facial recognition 112 and the sampler 113 can be implemented on a server or cloud processing environment through which facial authentication is performed over a network connection on behalf of the SST 100 or any networked primarily stationary computing device.

In an embodiment, the SST 100 operates in a mode of operation in which a clerk assists a customer (Point-Of-Sale (POS) terminal), and the facial authentication can be processed to authenticate the clerk for access to the POS terminal and/or customers being served by the clerk at the POS terminal.

In an embodiment, the SST 100 is an ATM.

In an embodiment, the SST 100 is a kiosk. In an embodiment, the kiosk is a travel kiosk.

These and other embodiments are now discussed with reference to the FIGS. 2-4.

Figure 2:
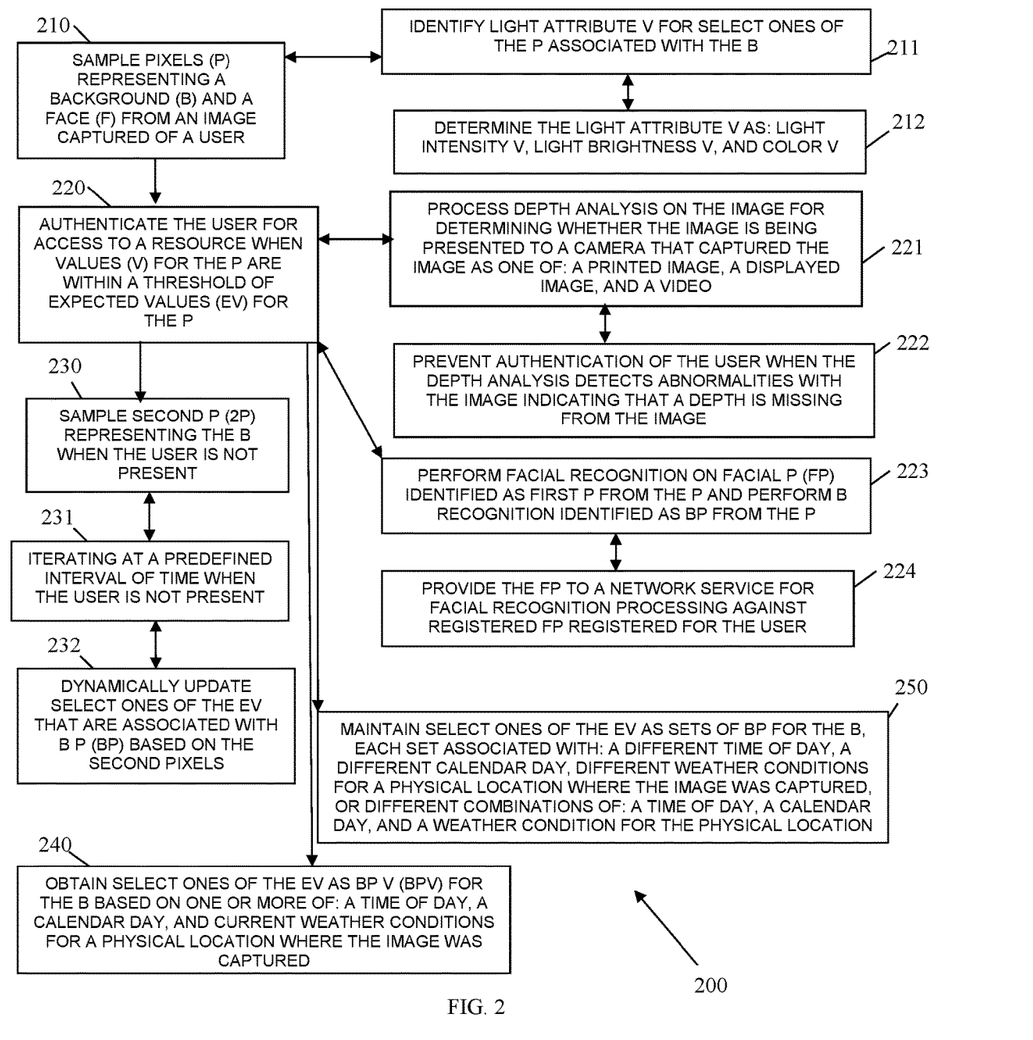
FIG. 2 is a diagram of a method for SST facial authentication, according to an example embodiment.

FIG. 2 is a diagram of a method 200 for SST facial authentication, according to an example embodiment. The software module(s) that implements the method 200 is referred to as a "facial authenticator." The facial authenticator is implemented as executable instructions programmed and residing within memory and/or a non-transitory computer-readable (processor-readable) storage medium and executed by one or more hardware processors of a hardware computing device. The processors of the device that executes the facial authenticator are specifically configured and programmed to process the facial authenticator. The facial authenticator has access to one or more networks during its processing. The networks can be wired, wireless, or a combination of wired and wireless.

In an embodiment, the device that executes the facial authenticator is the SST 110. In an embodiment, the SST 110 is an ATM. In an embodiment, the SST 110 is a kiosk. In an embodiment, the SST 110 operates in a clerk-assisted mode of operation where a clerk operates the SST 110 to perform transactions on behalf of a customer during checkout.

In an embodiment, the device that executes the facial authenticator is a server.

In an embodiment, the device that executes the facial authenticator is a stationary computing device.

In an embodiment, the facial authenticator is all or some combination of the modules 112 and 113.

At 210, the facial authenticator samples pixels representing a background and a face from an image captured of a user. The image may be a live image that is captured when the real user is standing in front of the camera that captures the image or the image may be a non-live image for which the camera is capturing the image as a printed image presented by the user, a displayed image on a mobile device display, or a video played on the mobile device display. The camera that captures the image as a predefined quality (pixel density) for the captured image and a predefined field of view (FOV). The sampled pixels from the image are different sets of pixels at predefined locations within the image that identify the face from the image and background objects. As discussed above with the FIGS. 1A and 1B, the machine-learning processing associated with the facial authenticator may change and dynamically alter the predefined locations associated with the background based on detected changed environmental conditions of the physical environment where the camera captures the image.

According to an embodiment, at 211, the facial authenticator identifies light attributes for select ones of the pixels associated with the background.

In an embodiment of 211 and at 212, the facial authenticator determines the light attribute values as light intensity values, light brightness values, and light color values.

At 220, the facial authenticator authenticates the user for access to a resource when values for the pixels are within a threshold range (predefined range) of expected values for the pixels.

In an embodiment, at 221, the facial authenticator processes a depth analysis on the image for determining the image is being presented to the camera that captured the image as one of: a printed image, a displayed image, and a video.

In an embodiment of 221 and at 222, the facial authenticator prevents any authentication of the user when the depth analysis detects abnormalities with the image indicating that a depth is missing from the image. The processing at 221 and 222 was discussed above with reference to the FIGS. 1A and 1B.

In an embodiment, at 223, the facial authenticator performs facial recognition on facial pixels identified as first pixels from the pixels of the captured image. The facial authenticator also performs background recognition identified as background pixels from the pixels of the captured image.

In an embodiment of 223 and at 224, the facial authenticator provides the facial pixels to a network service for facial recognition processing against registered facial pixels for the user. That is, a network-based third party service may, in some embodiments, be consulted for processing the facial recognition portion of the authentication at 220.

According to an embodiment, at 230, the facial authenticator samples a second set of pixels representing just the background when the user is not present (not in front of the FOV of the camera).

In an embodiment of 230 and at 231, the facial authenticator iterates the processing of 230 at predefined intervals of time while and when the user is not present (not in front of the FOV of the camera).

In an embodiment of 231 and at 232, the facial authenticator dynamically updates select ones of the expected values that are associated with the background pixels for the background based on the second pixels.

The processing of 230-232 represents a machine-learning process during which the facial authenticator learns and updates what it expects to see in the background of the FOV of the camera. Over time, the facial authenticator learns: 1) what are transitory objects within the physical environment of the background, and 2) what are permanent or somewhat permanent objects of the background. This allows the facial authenticator to dynamically determine what the expected background pixel values for the background objects should be at the time the image is captured with the user's face.

According to an embodiment, at 240, the facial authenticator obtains select ones of the expected values as background pixel values for the background based on one or more of: a time of day, a calendar day, and current weather conditions for the physical location where the image as captured (geographical location of the camera—this can be obtained through an Application Programming Interface (API) and a network connection to a web-based weather service).

In an embodiment, at 250, the facial authenticator maintains select ones of the expected values as sets of background pixels values for the background where each set is associated with: a different time of day, a different calendar day, different weather conditions, or different combinations of: a time of day, a calendar day, and a weather condition for the physical location of the camera. This allows the facial authenticator to select the expected background pixel values based on expected light attributes (as discussed above) for conditions that are expected to be present at the physical location at the exact time that the image was captured by the camera.

Figure 3:
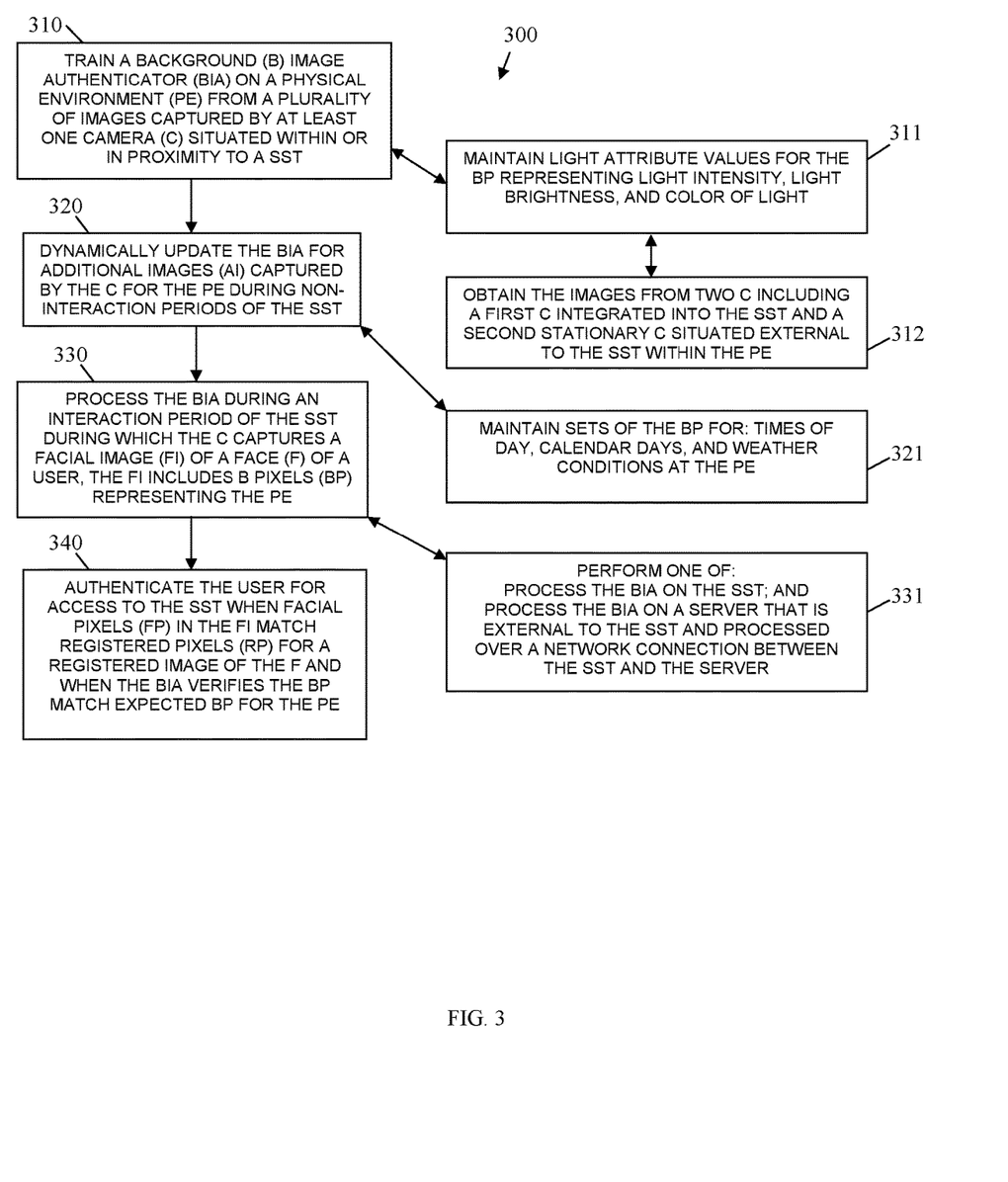
FIG. 3 is a diagram of another method for SST facial authentication, according to an example embodiment.

FIG. 3 is a diagram of another method 300 for SST facial authentication, according to an example embodiment. The software module(s) that implements the method 300 is referred to as a "facial and environmental authenticator." The facial and environmental authenticator is implemented as executable instructions programmed and residing within memory and/or a non-transitory computer-readable (processor-readable) storage medium and executed by one or more hardware processors of a hardware computing device. The processors of the device that executes the facial and environmental authenticator are specifically configured and programmed to process the facial and environmental authenticator. The facial and environmental authenticator has access to one or more networks during its processing. The networks can be wired, wireless, or a combination of wired and wireless.

In an embodiment, the device that executes the facial and environmental authenticator is the SST 110. In an embodiment, the SST 110 is an ATM. In an embodiment, the SST 110 is a kiosk. In an embodiment, the SST 110 operates in a clerk-assisted mode of operation where a clerk operates the SST 110 to perform transactions on behalf of a customer during checkout.

In an embodiment, the device that executes the facial and environmental authenticator is a server.

In an embodiment, the device that executes the facial and environmental authenticator is a stationary computing device.

In an embodiment, the facial and environmental authenticator is all or some combination of the modules 112, 113, and the method 200.

At 310, the facial and environmental authenticator trains a background image authenticator on a physical environment from a plurality of images that are captured by at least one camera situated within or in proximity to a SST where facial recognition authentication is performed. This is a machine-learning training process as discussed above.

In an embodiment, at 311, the facial and environmental authenticator maintains light attribute values for the background pixels of the images representing: light intensity, light brightness, and color of light. These attributes are dynamic changing conditions within the physical environment based on time of day, calendar day, and weather conditions.

In an embodiment of 311 and at 312, the facial and environmental authenticator obtains the images from at least two cameras that include a first camera that is integrated into the SST and a second stationary camera that is situated external to the SST within the physical environment where the SST is located.

At 320, the facial and environmental authenticator dynamically updates the background image authenticator for additional images captured by the at least one camera for the physical environment during non-interaction periods of the SST (periods where the SST has no customer/user at the SST).

In an embodiment, at 321, the facial and environmental authenticator maintains sets of the background pixels for: times of day, calendar days, weather conditions at the physical environment's geographical location, and combinations of these things.

At 330, the facial and environmental authenticator processes the background image authenticator during an interaction period (user is present at the SST) during which the at least one camera captures a facial image of a face of the user. The facial image also includes some background pixels representing some portion of the physical environment where the SST is located and within the FOV of the at least one camera.

In an embodiment, at 331, the facial and environmental authenticator can activate the background image authenticator for processing on the SST or for processing on a server that is external to the SST and processed over a network connection between the SST and the server.

According to an embodiment, at 340, the facial and environmental authenticator authenticates the user for access to the SST when facial pixels in the facial image match registered pixels for a registered image of the user's face and when the background image authenticator verifies that the background pixels included within the facial image match expected background pixels for the physical environment at the time the facial image was captured.

Figure 4:
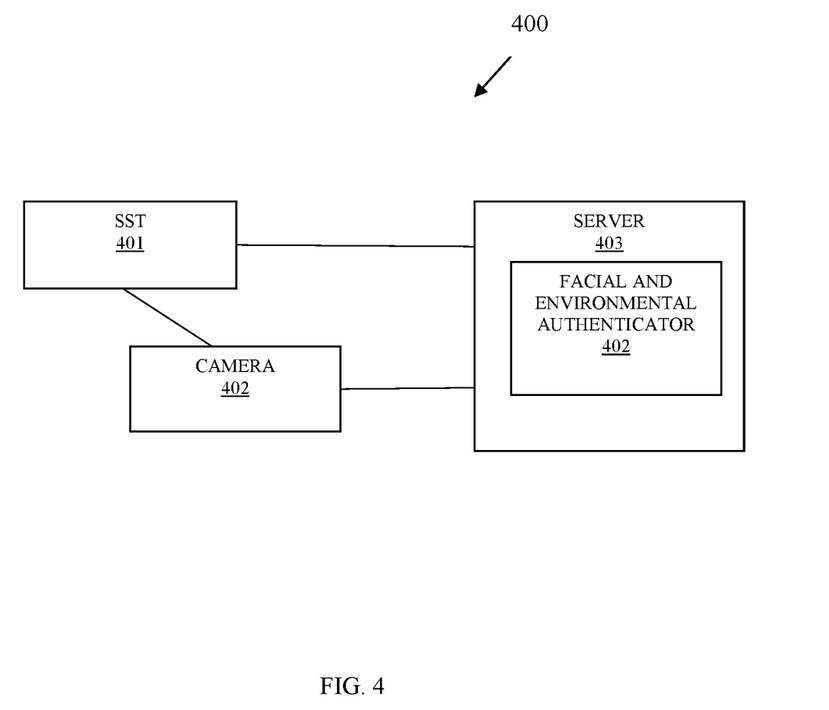
FIG. 4 is a diagram of another system for SST facial authentication, according to an example embodiment.

FIG. 4 is a diagram of another system 400 for facial and environmental authenticator, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1B and 2-3.

In an embodiment, the system 400 implements, inter alia, the method 200 of the FIG. 2.

In an embodiment, the system 400 implements, inter alia, the method 300 of the FIG. 3.

The system 400 includes a SST 401, at least one camera 402, and a server 403 having a facial authenticator and environmental 404.

In an embodiment, the SST 401 is an ATM.

In an embodiment, the SST 401 is a kiosk. In an embodiment, the kiosk is a travel kiosk.

In an embodiment, the SST 401 operates in a customer-assisted mode of operation as a POS terminal operated by a clerk (type of user) that assists a customer (another type of user) in performing checkout operations at the POS terminal.

The facial and environmental authenticator 404 is configured to: 1) execute on at least one hardware processor of the server 403, dynamically maintain at least one background profile for background images captured by the at least one camera 402 of a physical environment of the SST 401, and (iii) provide authentication of background pixels captured by the at least one camera 402 in a facial image of a user based on the at least one background profile to augment facial recognition processing on facial pixels present in the facial image.

In an embodiment, the facial and environmental authenticator 404 is all or some combination of: the modules 112-113, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   sampling pixels of an image that is captured of a user, the pixels comprising image representations of both a background and a face of the user;
   identifying from background pixels selected from the pixels that are associated with background environmental objects and obtaining background conditions, wherein identifying further includes separating permanent objects associated with the background from non-permanent objects associated with the background based on applying the background conditions to the background pixels;

authenticating the user for access to a resource based on face pixels that are selected from the pixels and based on the permanent objects separated from the non-permanent objects in the background pixels: 1) when face pixel values for the face pixels_are within a threshold of expected face pixel values for the face of the user and 2) when permanent object pixel values associated with the permanent objects are determined to be expected permanent object pixel values that are expected to be present for the background, wherein authenticating further includes obtaining the expected permanent object pixel values based on: a time of day, calendar day, and current weather conditions for a physical location where the image was captured; and maintaining select ones of the expected permanent object pixel values as sets of the background pixels for the background, each set associated with: a different time of day, a different calendar day, different weather conditions for a physical location where the image was captured, or different combinations of: times of day, calendar days, and weather conditions for the physical location.

2. The method of claim 1 further comprising, sampling second pixels representing the background when the user is not present.

3. The method of claim 2, wherein sampling the second pixels further includes iterating the sampling of the second pixels at a predefined interval of time when the user is not present.

4. The method of claim 3, wherein iterating further includes dynamically updating the expected permanent object pixel values that are associated with permanent objects based on the sampling of the second pixels.

5. The method of claim 1, wherein sampling further includes identifying light attribute values for select ones of the pixels associated with the background.

6. The method of claim 5, wherein identifying further includes determining the light attribute values as: light intensity values, light brightness values, and color values.

7. The method of claim 1, wherein authenticating further includes processing depth analysis on the image for determining whether the image is being presented to a camera that captured the image as one of: a printed image of the user, a displayed image displayed on a display of a mobile device, and a video played on display of the mobile device.

8. The method of claim 7, wherein processing further includes preventing authentication of the user when the depth analysis detects abnormalities with the image indicating that a depth is missing from the image.

9. The method of claim 1, wherein authenticating further includes performing facial recognition on the face pixels and performing background object recognition on the background pixels.

10. The method of claim 9, wherein performing the facial recognition further includes providing the face pixels to a network service for facial recognition processing against registered face pixels registered for the user, wherein the registered face pixels comprise the expected face pixels values.

* * * * *